United States Patent [19]

Tolliver

[11] 4,184,520

[45] Jan. 22, 1980

[54] MANUALLY FORMABLE STIRRUP MAT REINFORCEMENT AND PIPE REINFORCING METHOD BASED THEREON

[76] Inventor: Wilbur E. Tolliver, 364 Hamilton Dr., Holland, Mich. 49423

[21] Appl. No.: 858,103

[22] Filed: Dec. 7, 1977

[51] Int. Cl.$^2$ ............................................. B21F 27/20
[52] U.S. Cl. ...................................... 140/107; 52/662
[58] Field of Search ................... 140/112, 107; 245/2, 245/11; 138/175, 174; 52/600, 650, 651, 653, 662; 264/271, 277

[56] References Cited

U.S. PATENT DOCUMENTS

| 372,818 | 11/1887 | Sackett | 245/11 |
| 810,561 | 1/1906 | Peabody | 245/2 |
| 1,389,942 | 9/1921 | Freyssinet | 52/662 |
| 1,499,719 | 7/1924 | Bille | 264/271 |
| 2,301,760 | 11/1942 | Sutton | 264/277 |
| 3,826,287 | 7/1974 | Tolliver | 138/175 |

*Primary Examiner*—Lowell A. Larson

[57] ABSTRACT

The specification discloses a stirrup mat which a pipe producer manually forms in or on, and assembles to, a concrete pipe reinforcing cage, which assembly is then cast into a concrete pipe. The mat includes a plurality of parallel stirrup members, each having multiple projections, joined by just enough tie wires, 2 to 6, to give the mat dimensional stability. The tire wires are made of a flexible or ductile material having sufficient flexibility or ductility to allow the mat to be manually, arcuately shaped so as to conform to the curvature of the cage to which it is assembled.

17 Claims, 6 Drawing Figures

MANUALLY FORMABLE STIRRUP MAT REINFORCEMENT AND PIPE REINFORCING METHOD BASED THEREON

BACKGROUND OF THE INVENTION

The present invention relates to welded wire reinforcing mats for use in the manufacture of concrete pipe. In manufacturing concrete pipe, a length of fabric, comprising interwelded sets of criss-crossed strands, is cut into a suitable length and formed into a circular or elliptical cage. Often, stirrup reinforcement is added to this cage before it is cast into a concrete pipe. Individual lengths of wire, called stirrups, are individually welded or attached to the wires of the cage, generally at the crown and invert thereof. Also available are sinusoidal strands of wire which define a plurality of stirrup projections in a row. By welding several of these sinusoidal strands to the cage, one minimizes the amount of welding and stirrup members required.

In one aspect of my earlier invention disclosed in U.S. Pat. No. 3,844,511, I conceived of the concept of providing mats of ordinary fabric having a plurality of stirrups arranged in parallel rows so that an entire section of a cage could be readily reinforced with stirrups by simply forming a mat to an arcuate shape and placing it in or on the cage and welding it. One problem with that concept is that the mat must somehow be formed into the required curvilinear or arcuate configuration to conform to the curvature of the cage. This requires the use of some type of mechanical former. Mechanical forming would be particularly difficult if not impossible if hinged stirrups are not used.

SUMMARY OF THE INVENTION

In the present invention, the pipe producer is provided with a mat having a plurality of parallel stirrup members running lengthwise, each having plural stirrup projections, joined by only a sufficient number of tie wires to give the mat dimensional stability, the tie wires being of a material of sufficient flexibility that they, and the entire mat, can be manually bent into an arcuate curvature corresponding to the curvature of the cage. The mat is simply placed in the cage or over the cage and then manually formed to the curvature of the cage and secured in place by welding wire tieing or the like.

This greatly simplifies the use of the mat in terms of the forming operation. Also, it eliminates a large amount of wasted wire since only sufficient tie wires are used to give the mat dimensional stability and no additional transverse wires are required. Also because of the ease of forming the mat, the mat can be tightly fitted to the cage, thereby further aiding the cage in resisting deformation when the pipe is subjected to load.

DESCRIPTION OF THE DRAWINGS

These and other objects, advantages and features of the invention will be more fully understood and appreciated by reference to the written specification and appended drawings in which.

DESCRIPTION OF THE PREFERRED EMBODIMENT

Figure 1:
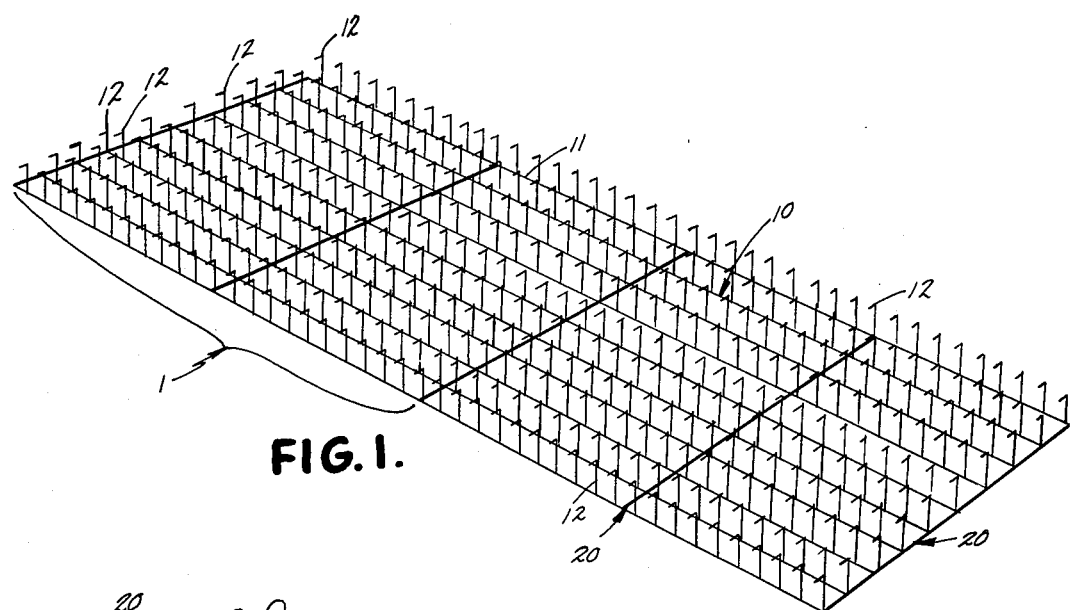
FIG. 1 is a perspective view of a stirrup reinforcing mat made in accordance with the present invention.

In the preferred embodiment, the mat 1 comprises a plurality of stirrup members 10 arranged in parallel relationship and being joined together by five or six tie wires 20. Each stirrup member 10 includes a longitudinally extending base wire 11 with a plurality of short wires or stirrup projections 12 welded thereto and projecting upwardly therefrom. Base wire 11 and projections 12 are formed of conventional steel reinforcing wire or deformed wire of the type conventionally used in reinforcing concrete pipe.

Each of the five tie wires 20 is comprised of standard bright basic ASTM A-82 wire of a cross sectional area of from about 0.02 to about 0.06 square inches. Normally one would not exceed 0.04 square inches, except in mats for heavier "D load" pipe. Tie wires 20 must be sufficiently flexible so that they can be formed into an arcuate configuration by hand.

There must be a sufficient number of tie wires 20 in a given mat to insure that the mat will have sufficient dimensional stability that it will not be flimsy or cumbersome to handle. For mat used in reinforcing smaller pipe, and therefore smaller cages, perhaps as few as two wires would be sufficient. Where the mat must be larger, for use in stirruping a larger pipe, as many as five or six tie wires will be required, and in some situations, possibly more.

The exact longitudinal and lateral dimensions of each mat will vary depending on the dimensions of the pipe which it is to reinforce. Usually, specifications require that the stirrup reinforcement span an arc of about 60°, 30° to either side of the crown or invert lines of the pipe. Thus, the mat 1 for a particular size pipe will have to be sufficiently large to span this required arc. Typically, about 11 stirrup members 10 are required. The standard width for mat 1 is 86 inches with a standard length of 54 inches, for a 96 inch diameter and eight foot long pipe. The cage 30 itself is a little wider, about 8 inches, since its end extends into the male end of the pipe.

Figure 2:
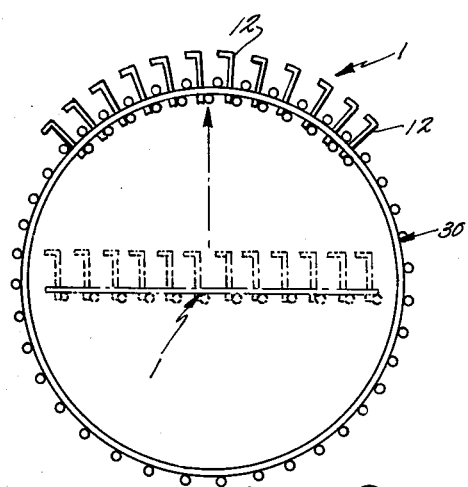
FIG. 2 is an end elevational view of a circular cage with a stirrup mat in accordance with the present invention being shown both in phantom and then being shown by projection lines as it is being manually shaped to the configuration of the cage.

FIG. 2 illustrates the use of the mat 1 made in accordance with the present invention. After the reinforcing cage 30 has been formed, mat 1 is placed inside cage 30 and is raised upwardly and bent until stirrup projections 12 are pushed through to the outside of the cage and mat 1 generally conforms to the circular configuration of the cage 30. Mat 1 is then welded or wire tied to the cage at several different points to secure it.

Figure 3:
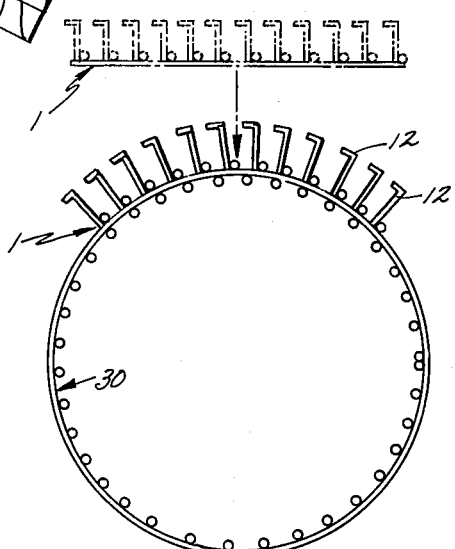
FIG. 3 is an end elevational view of a cage and mat in which the mat of the present invention is shown being shaped over the outside of the configuration of the cage.

In FIG. 3, an alternative approach is used whereby mat 1 is laid over the top of a cage 30 and pushed down on either side to bend the tie wires 20 and shap the mat to the general configuration of cage 30. Again, mat 1 is welded or wire tied to cage 30 at several points to insure proper securance. Naturally, the mats 1 may also be welded or secured to the invert area of the pipe as well as the crown area. In some cage assemblies, mats 1 may be welded or secured to the spring line areas of the cage.

There is another difference between FIGS. 2 and 3 which illustrate other possible variations. In FIG. 2, the base wires 11 lie on the underside of mat 1, while in FIG. 3 they lie on the top side. Similarly in FIG. 2 the cage 30 longitudinal wires lie on the outside of the cage whereas in FIG. 3 the same wires are on the inside of the cage. These variations are not important to the concept of this invention.

The resulting stirruped cage assembly is placed in a pipe form. Concrete is cast in around the cage and after conventional curing, the pipe is ready for use. Often, the overall reinforcing assembly includes an inside cage and an outside cage with stirrup reinforcement extending between the two. The present invention is useful in variations of this type.

Figure 4:
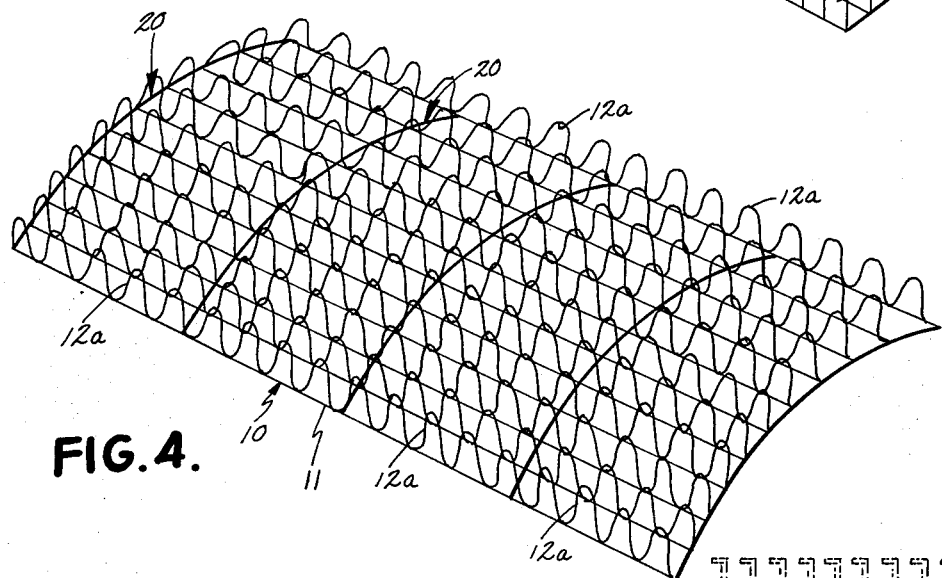
FIG. 4 is a perspective view of an alternative embodiment mat using a plurality of sinusoidal strands as stirrup members, with the mat being shown alone after it has been formed into an arcuate, curved configuration.

FIG. 4 shows what a mat looks like after it has been manually shaped into an arcuate configuration. There may be instances in which the producer will manually form the mat somewhat prior to actually placing it inside or over a cage 30. Also, the mat of FIG. 4 uses alternative embodiment stirrup means 10a which are sinusoidally curved wires with the projecting nodes serving as stirrup projections 12a. And while base wires 11 are shown in FIG. 4, they could be eliminated and tie wires 20 secured directly to the sinusoidal strands 12a at the nodes thereof.

Figure 5:
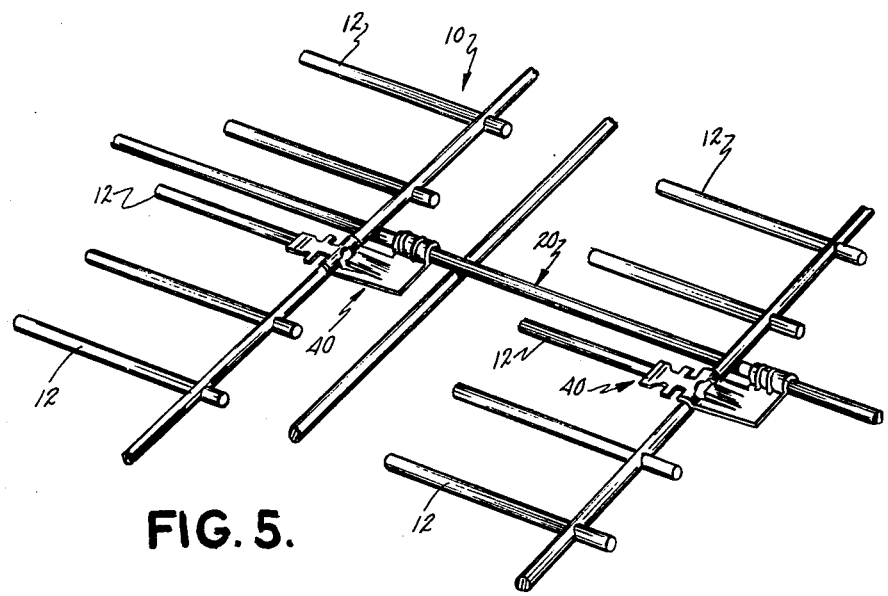
FIG. 5 is a perspective view of a small portion of another alternative embodiment of the mat in which the stirrup members are hingedly secured to the tie wires.
Figure 6:
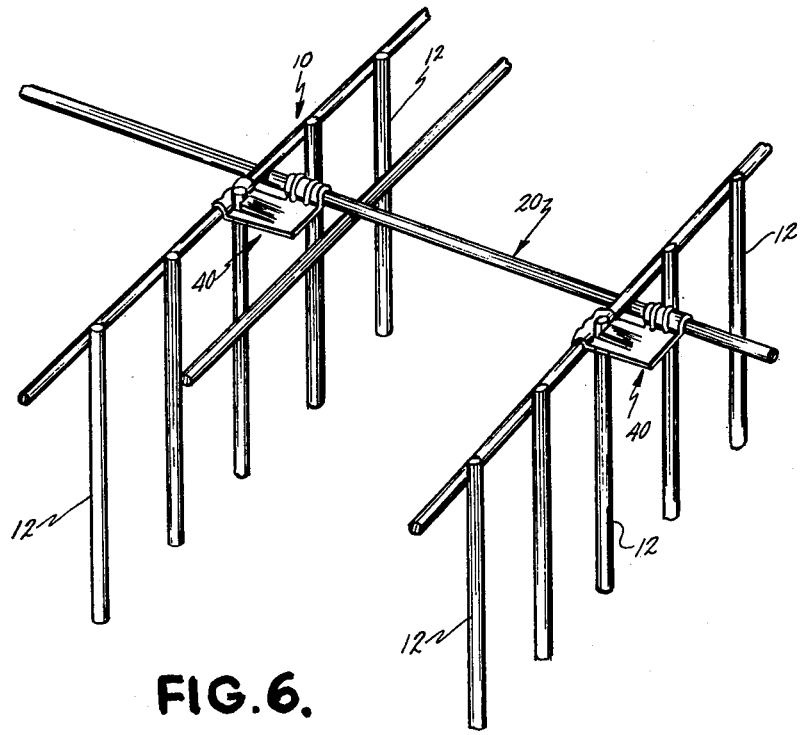
FIG. 6 is a perspective view of the small section of the alternative embodiment mat shown in FIG. 5 with the stirrup members rotated to their erected position.

The hinged stirrup concept, also described in my prior U.S. Pat. No. 3,840,054 may also be employed in mats made in accordance with this invention (FIGS. 5 and 6). Basically, each stirrup member 10 would be joined to the cross members 20 by means of a hinge connector 40. The hinge disclosed in U.S. Pat. No. 3,857,416 of Dec. 31, 1974, invented by Daniel J. Borodin and Mort W. Henry would provide a suitable hinge for this purpose, with minor modifications to facilitate securance to cross wires 20. Other hinging techniques might also be employed.

The advantage of this alternative embodiment is that prior to erection, the stirrup projections 12 lie in the same plane as the tie wires 20, thereby making the alternative embodiment mat a flatter, easier package to ship. Once the alternative embodiment mats have reached the job site, the stirrup members 10 can be rotated so that the stirrup projections 12 project laterally out of the plane of tie wires 20 (see FIG. 6).

In yet another alternative embodiment, the stirrup projections are spaced to match the pitch of a spiral wire in a spiral wound cage. Thus the invention can be adapted for use in cages which are wound on a machine as well as in cages rolled from conventional welded wire fabric.

Of course, it is understood that the above are merely preferred embodiments of the invention and that various alternatives and modifications can be made without departing from the spirit and broader aspects of the invention as set forth in the appended claims.

The embodiments of the invention in which an exclusive property or privilege is claimed are defined as follows:

1. A method for preparing a reinforcing cage for concrete pipe wherein a cage is first formed to a desired configuration, the improvement in said method comprising: providing a stirrup mat having a plurality of generally parallel stirrup members, each including a plurality of stirrup projections projecting laterally therefrom, said stirrup members being interconnected by only a sufficient number of tie wires to give said mat dimensional stability whereby it can be handled, without collapsing, in various orientations including a generally horizontal orientation and can thereby be moved to and located at the area of the cage to be reinforced, said tie wires being sufficiently flexible that they can be manually bent into an arcuate curvature, but being sufficiently stiff that they make said dimensional stability possible; placing said mat adjacent a formed cage, manually forming said mat to the general curvature of said cage and securing it to said cage with said stirrup projections projecting generally radially away from the curved plane defined by the curvature of said cage.

2. The method of claim 1 which includes providing said mat with said tie wires being bright basic wire having a cross sectional area of about 0.02 to 0.06 square inches.

3. The method of claim 2 in which said step of providing said mat includes providing said mat with from 2 to about 6 of said tie wires.

4. The method of claim 3 in which each of said tie wires has a length sufficient to span the desired arc of the cage to be stirruped.

5. The method of claim 4 in which said stirrup members are made of conventional concrete pipe reinforcing steel.

6. The method of claim 1 in which said step of providing said mat includes providing said mat with from 2 to about 6 of said tie wires.

7. The method of claim 1 in which said stirrup members are made of conventional concrete pipe reinforcing steel.

8. The method of claim 1 in which said step of manually forming said mat is accomplished by placing said mat inside said cage and manually shaping it to the curvature of said cage at the cage area to which said mat is to be secured to said cage.

9. The method of claim 1 in which said step of manually forming said mat is accomplished by placing said mat over said cage and manually shaping it to the curvature of said cage at the cage area to which said mat is to be secured to said cage.

10. A stirrup mat for assembly to a reinforcing cage for concrete pipe comprising: a plurality of generally parallel stirrup members, each including a plurality of stirrup projections projecting laterally therefrom; only a sufficient number of tie wires secured to and interconnecting said stirrup members to give said mat dimensional stability whereby it can be handled, without collapsing, in various orientations including a generally horizontal orientation and can thereby be moved to and located at the area of the cage to be reinforced, said tie wires being sufficiently flexible that they can be manually bent into an arcuate curvature corresponding to the general curvature of a cage with said stirrup projections projecting generally radially away from the curved plane defined by the curvature of said cage, but being sufficiently stiff that they make said dimensional stability possible.

11. The stirrup mat of claim 10 wherein said tie wires are bright basic wire having a cross sectional area of about 0.02 to 0.06 square inches.

12. The stirrup mat of claim 11 with from 2 to about 6 of said tie wires.

13. The stirrup mat of claim 12 in which each of said tie wires has a length sufficient to span the desired arc of the cage to be stirruped.

14. The stirrup mat of claim 13 in which said stirrup members are made of conventional concrete pipe reinforcing steel.

15. The stirrup mat of claim 10 with from 2 to about 6 of said tie wires.

16. The stirrup mat of claim 10 in which each of said tie wires has a length sufficient to span the desired arc of the cage to be stirruped.

17. The stirrup of claim 10 in which said stirrup members are made of conventional concrete pipe reinforcing steel.

* * * * *